(12) United States Patent
Zhou

(10) Patent No.: US 11,073,854 B2
(45) Date of Patent: Jul. 27, 2021

(54) PRE-CHARGED FAST WAKE UP LOW-DROPOUT REGULATOR

(71) Applicant: SKYWORKS SOLUTIONS, INC., Irvine, CA (US)

(72) Inventor: Bo Zhou, Acton, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 163 days.

(21) Appl. No.: 16/199,902

(22) Filed: Nov. 26, 2018

(65) Prior Publication Data

US 2019/0196525 A1 Jun. 27, 2019

Related U.S. Application Data

(63) Continuation of application No. 15/085,647, filed on Mar. 30, 2016, now Pat. No. 10,156,860.

(60) Provisional application No. 62/140,738, filed on Mar. 31, 2015.

(51) Int. Cl.
*G05F 1/575* (2006.01)
*H02M 1/12* (2006.01)
*G05F 1/46* (2006.01)
*H02M 3/338* (2006.01)

(52) U.S. Cl.
CPC .............. *G05F 1/575* (2013.01); *G05F 1/46* (2013.01); *G05F 1/468* (2013.01); *H02M 1/12* (2013.01); *H02M 3/3382* (2013.01)

(58) Field of Classification Search
CPC ............ G05F 1/46; G05F 1/468; G05F 1/575; H02M 1/12; H02M 3/3382
See application file for complete search history.

(56) References Cited

U.S. PATENT DOCUMENTS

| 7,336,058 B1 | 2/2008 | Lo et al. |
| 7,502,719 B2 | 3/2009 | Moraveji |
| 9,817,416 B2 | 11/2017 | Gebeyehu et al. |
| 2003/0111985 A1 | 6/2003 | Xi |
| 2003/0178976 A1 | 9/2003 | Xi |
| 2006/0170485 A1 | 8/2006 | Menke |
| 2007/0046271 A1 | 3/2007 | Zolfaghari |
| 2009/0102558 A1 | 4/2009 | Adachi |
| 2009/0104951 A1 | 4/2009 | Nakatani et al. |
| 2009/0167266 A1 | 7/2009 | Al-Shyoukh et al. |
| 2010/0109624 A1 | 5/2010 | Lourens et al. |
| 2011/0074508 A1* | 3/2011 | Imura ..................... G05F 1/565 330/253 |
| 2011/0156686 A1 | 6/2011 | Gakhar et al. |

(Continued)

*Primary Examiner* — Emily P Pham
(74) *Attorney, Agent, or Firm* — Knobbe, Martens, Olson & Bear, LLP

(57) ABSTRACT

Embodiments described herein present a new LDO design that eliminates the need for the sleep bias circuitry included in other systems. Further, the new LDO design can be biased with a small fraction of the operating current enabling the LDO to wake up substantially faster than previous LDO designs that include separate sleep circuitry. In some cases, the LDO can instantly (or faster than other LDOs) transition from a sleep mode to an operating mode enabling improved operation compared to prior LDOs. Furthermore, the new LDO design maintains a non-breakdown voltage across the transistors reducing the need to enter sleep mode to prevent transistors of the LDO from entering a breakdown region.

20 Claims, 7 Drawing Sheets

(56) References Cited

U.S. PATENT DOCUMENTS

| | | |
|---|---|---|
| 2011/0278127 A1* | 11/2011 | Gebhart .............. F16D 25/0632 |
| | | 192/66.1 |
| 2011/0287729 A1 | 11/2011 | Chien et al. |
| 2012/0161637 A1 | 6/2012 | Lee et al. |
| 2013/0234688 A1 | 9/2013 | Sakaguchi |
| 2015/0137780 A1 | 5/2015 | Lerner et al. |
| 2015/0234403 A1 | 8/2015 | Siao et al. |
| 2016/0042579 A1 | 2/2016 | Austen et al. |
| 2016/0070665 A1 | 3/2016 | Wan |
| 2016/0103458 A1 | 4/2016 | Shukia et al. |
| 2016/0147239 A1* | 5/2016 | Yan ......................... G05F 1/575 |
| | | 323/280 |
| 2016/0224040 A1* | 8/2016 | Peluso ..................... G05F 3/16 |
| 2016/0291620 A1 | 10/2016 | Zhou |

\* cited by examiner

PRE-CHARGED FAST WAKE UP LOW-DROPOUT REGULATOR

RELATED APPLICATIONS

This application is a continuation of U.S. application Ser. No. 15/085,647 which was filed on Mar. 30, 2016 and is titled "PRE-CHARGED FAST WAKE UP LOW-DROPOUT REGULATOR," the disclosure of which is hereby expressly incorporated by reference herein in its entirety for all purposes, and which claims priority to U.S. Provisional Application No. 62/140,738, which was filed on Mar. 31, 2015 and is titled "PRE-CHARGED FAST WAKE UP LOW-DROPOUT REGULATOR," the disclosure of which is hereby expressly incorporated by reference herein in its entirety for all purposes.

BACKGROUND

Technical Field

The disclosed technology relates to a low-dropout regulator (LDO). Description of Related Technology Many devices incorporate one or more amplifiers. An amplifier enables a signal to be amplified by adjusting the voltage of the signal. One type of amplifier that is included in wireless devices is a low noise amplifier (LNA). An LNA is generally used to amplify a low power signal. Often, LNAs are found in receivers, such as the receivers of wireless devices.

In some systems, the LNA may be in communication with a low-dropout regulator (LDO). The LDO is a type of voltage regulator that can regulate an output voltage.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

SUMMARY

Figure 1:
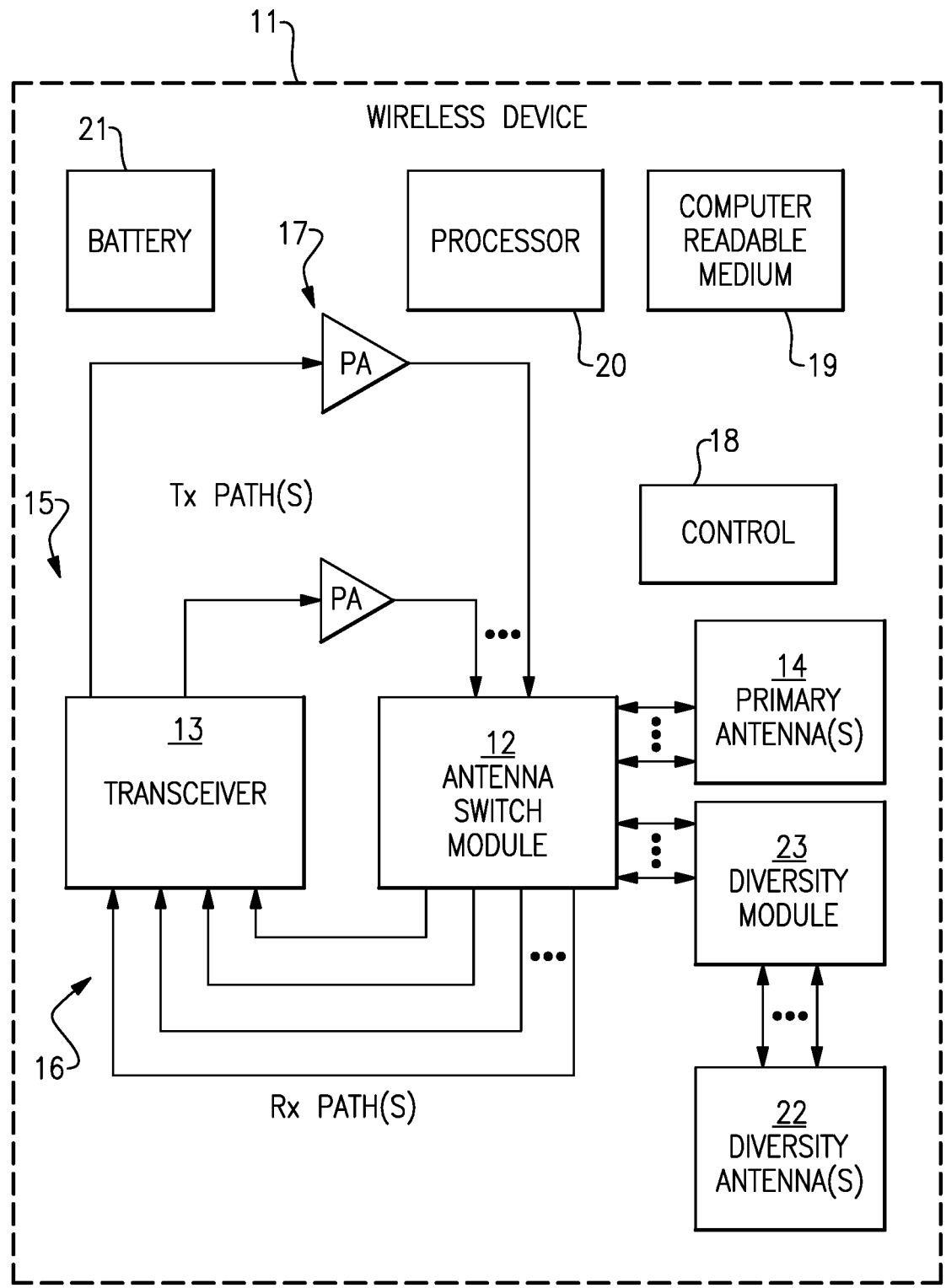
FIG. 1 is a schematic block diagram of one example of a wireless device.

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a low-dropout regulator (LDO) circuit. The LDO circuit may include an input stage circuit, which may include a current source and an input transistor network configured to receive a reference voltage input. Further, the LDO circuit may include an output stage circuit, which may include an output transistor and a cutoff transistor. The cutoff transistor may be configured to control the output of an output voltage supplied by the output transistor enabling the LDO circuit to enter a sleep mode. The output voltage may be based at least in part on the reference voltage.

In some embodiments, the current source may be configured to supply a small current to transistors of the LDO circuit when the LDO circuit enters the sleep mode enabling the LDO to wake up from the sleep mode without waiting for a charge time period. Further, the small current may be approximately 0.5 $\mu A$, less than 0.5 $\mu A$, 1 $\mu A$, or between 0.5 $\mu A$ and 1 $\mu A$. In some cases, the small current may be some other relatively small current value.

In some implementations, the input transistor network is a current mirror. Furthermore, transistors of the input transistor network may be n-channel field-effect transistors (FETs). Moreover, the output transistor and the cutoff transistor may be p-channel FETs. The cutoff transistor may be positioned between a drain of the output transistor and an output node of the LDO circuit. In certain embodiments, the inclusion of the cutoff transistor prevents a voltage of the output transistor from reaching a breakdown voltage without the inclusion of a breakdown voltage prevention circuit.

In addition, the output stage circuit may supply the output voltage to a low noise amplifier (LNA) when a voltage representing logic-high is supplied to a base of the cutoff transistor. Further, the LDO circuit may include a first resistor and a second resistor connected in series. The first resistor may be positioned between a drain of the output transistor and a node configured to be at the reference voltage. The second resistor may be positioned between the node and a ground node. Further, the output voltage may be based at least in part on a ratio of a value of the second resistor to a total resistance of the first resistor and the second resistor. Moreover, in some cases, the cutoff transistor enables the LDO circuit to enter the sleep mode without the inclusion of a sleep circuit in the LDO circuit.

Other aspects of the present disclosure relate to a diversity module. The diversity module may include a low noise amplifier (LNA) and a controller in electrical communication with the LNA. The controller can include a low-dropout regulator (LDO) circuit. The LDO circuit can include an output stage circuit, which may include an output transistor and a cutoff transistor. The cutoff transistor may be configured to control output of an output voltage supplied by the output transistor enabling the LDO circuit to enter a sleep mode.

In certain embodiments, the LDO circuit further includes an input stage circuit including a current source and an input transistor network configured to receive a reference voltage as an input to the LDO circuit. Further, the current source may be configured to supply a small current to transistors of the input stage circuit when the LDO circuit enters the sleep mode enabling the transistors of the input stage circuit to wake up from the sleep mode without waiting for a charge time period. The small current may be a fraction of the current supplied to the transistors of the input stage circuit when the LDO circuit is not in sleep mode. The transistors of the input transistor network may be of a first transistor type, and the cutoff transistor and the output transistor may be of a second transistor type that differs from the first transistor type.

With some implementations, the cutoff transistor may be positioned between the output transistor and an output node of the controller. Further, the cutoff transistor may supply the output voltage to the LNA when the LDO is not in sleep mode and the output voltage may be based at least in part on a reference voltage supplied to the LDO. In addition, the cutoff transistor may enable the LDO circuit to enter the sleep mode without the inclusion of a sleep circuit in the LDO circuit.

Additional aspects of the present disclosure relate to a method of controlling a low-dropout regulator (LDO) circuit. The method may include receiving a control signal from a controller and providing the control signal to a cutoff transistor of the LDO circuit. Further, the method may include receiving a reference voltage at an input stage of the LDO circuit. In addition, the method may include maintaining a voltage across an output transistor regardless of whether the control signal is associated with a sleep mode. The method may further include determining whether the control signal is associated with the sleep mode. In response to determining that the control signal is associated with the sleep mode, the method may include entering a power down mode.

In some embodiments, the control signal is received at the controller from a base station in wireless communication with a wireless device. The wireless device may include the LDO circuit. Further, the controller may access a configuration from a non-volatile memory to determine a value for the control signal. In addition, the power down mode may be entered without the use of a separate sleep circuit.

Although certain embodiments and examples are disclosed herein, inventive subject matter extends beyond the examples in the specifically disclosed embodiments to other alternative embodiments and/or uses, and to modifications and equivalents thereof.

DETAILED DESCRIPTION

Introduction

Typically, a wireless device will include one or more low noise amplifiers (LNAs) which are used to process signals received by an antenna of the wireless device. An LNA may often receive a voltage from a voltage regulator, such as a low-dropout (LDO) regulator, which may be a linear voltage regulator. Often, the voltage supplied by the LDO regulator is set below a battery voltage provided by a power supply.

In many cases, because the battery voltage exceeds the voltage capability of the LDO regulator, one or more transistors of the LDO circuit may exceed a breakdown voltage. When a transistor exceeds a breakdown voltage, it can cause the transistor, and in some cases, elements in electrical communication with the transistor to overheat. The overheating elements can result in damage to the circuit.

One solution to prevent transistors of the LDO from entering a breakdown region or a breakdown mode is to include a sleep circuit that is capable of putting the LDO in a power down or sleep mode. This sleep circuit is in addition to the circuitry of the LDO that enables the LDO to regulate a voltage supplied to an LNA. Typically, the sleep circuit is a complex circuit that includes a number of transistors and can supply special bias voltages to the transistors of the LDO. The sleep bias circuit not only increases the complexity of the LDO, but it also increases the complexity of the controller for controlling the operating mode of the LDO.

Moreover, the additional circuitry increases the size and cost of the LDO. Further, the complex sleep bias circuits are in addition to the bias circuitry used to bias the transistors of the LDO when in an active operating mode.

After the LDO receives a signal to exit sleep mode, a non-insignificant amount of time is required to transition the LDO from sleep mode to an active operating mode. In some cases, it can take a relatively long time (e.g., 20-30 µs or longer) to charge up the output of the LDO from zero to its operational output voltage when transitioning to active mode. The complex circuitry and the inclusion of multiple bias modes can make the LDO slow to wake-up or enter a normal or active operating state.

Embodiments described herein present a new LDO design that eliminates the need for the sleep bias circuitry. Further, the new LDO design can be biased with a small fraction of the operating current enabling the LDO to wake up substantially faster than previous LDO designs that include separate sleep circuitry without, in some cases, having a large impact on the battery life of a device that includes the new LDO design. In some cases, the LDO can instantly transition from a sleep mode to an operating mode enabling improved operation compared to prior LDOs. Furthermore, the new LDO design maintains a non-breakdown voltage across the transistors reducing the need to enter sleep mode to prevent transistors of the LDO from entering a breakdown region.

In certain embodiments, the LDO includes a cutoff transistor that enables the LDO to regulate the voltage supplied to an LNA without using a sleep circuit. Further, in certain embodiments, the cutoff transistor enables a current to be supplied to an output transistor of the LDO preventing the output transistor from entering a breakdown region. In addition, the cutoff transistor enables a current to be supplied to a set of input transistors of the LDO to maintain a pre-charge state enabling a fast wakeup operation.

Example Wireless Device

FIG. 1 is a schematic block diagram of one example of a mobile device or wireless device 11 that can include embodiments of the LDO described herein. For example, the diversity module 23 may include an LDO.

The example wireless device 11 depicted in FIG. 1 can represent a multi-band and/or multi-mode device such as a multi-band/multi-mode mobile phone. By way of example, the wireless device 11 can implement the Global System for Mobile (GSM) communication standard, which is a mode of digital cellular communication that is utilized in many parts of the world. GSM mode capable mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, as many as twenty-two, or in some cases even more, radio frequency spectrum bands.

Radio frequency (RF) modules of the present disclosure can be used within a mobile device implementing the foregoing example modes and/or bands, and in other communication standards. For example, 3G, 4G, LTE, and Advanced LTE are non-limiting examples of such standards.

In certain embodiments, the wireless device 11 can include an antenna switch module 12, a transceiver 13, one or more primary antennas 14, power amplifiers 17, a control component 18, a computer readable medium 19, a processor 20, a battery 21, one or more diversity antennas 22, and a diversity module 23.

The transceiver 13 can generate RF signals for transmission via the primary antenna(s) 14 and/or the diversity antenna(s) 22. Furthermore, the transceiver 13 can receive incoming RF signals from the primary antenna(s) and/or the diversity antenna(s) 22. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna switch module 12 via one or more transmission paths 15. In the example shown, different transmission paths 15 can represent output paths associated with different bands and/or different power outputs. For instance, the two different paths shown can represent paths associated with different power outputs (e.g., low power output and high power output), and/or paths associated with different bands. The transmit paths 15 can include one or more power amplifiers 17 to aid in boosting a RF signal having a relatively low power to a higher power suitable for transmission. Although FIG. 1 illustrates a configuration using two transmission paths 15, the wireless device 11 can be adapted to include more or fewer transmission paths 15.

In FIG. 1, one or more received signals are depicted as being provided from the antenna switch module 12 to the transceiver 13 via one or more receiving paths 16. In the example shown, different receiving paths 16 can represent paths associated with different bands. For example, the four example paths 16 shown can represent quad-band capability that some mobile devices are provided with. Although FIG. 1 illustrates a configuration using four receiving paths 16, the wireless device 11 can be adapted to include more or fewer receiving paths 16.

To facilitate switching between receive and/or transmit paths, the antenna switch module 12 can be included and can be used to electrically connect a particular antenna to a selected transmit or receive path. Thus, the antenna switch module 12 can provide a number of switching functionalities associated with an operation of the wireless device 11. The antenna switch module 12 can include one or more multi-throw switches configured to provide functionalities associated with, for example, switching between different bands, switching between different power modes, switching between transmission and receiving modes, switching between different antennas (e.g., primary antennas 14 or diversity antennas 22) or some combination thereof. The antenna switch module 12 can also be configured to provide additional functionality, including filtering and/or duplexing of signals.

FIG. 1 illustrates that in certain embodiments, the control component 18 can be provided for controlling various control functionalities associated with operations of the antenna switch module 12, the diversity module 23, and/or other operating component(s). For example, the control component 18 can provide control signals to the antenna switch module 12 and/or the diversity module 23 to control electrical connectivity to the primary antenna(s) 14 and/or diversity antenna(s) 22. Further, the control component 18 can provide control signals to the diversity module to control a sleep state of the diversity module 23, or of elements therein, such as an LDO circuit. Moreover, the control component 18 can provide control signals to the diversity module 23 to control one or more bias voltages provided to elements of the diversity module 23. In some embodiments, the control component 18 can include volatile memory and/or non-volatile memory, such as a read-only memory (ROM) or other computer-readable medium, which can store control states or control instructions implemented by the control component 18. In some cases, the control component 18 can access the computer readable medium 19 to determine control information for the diversity module 23 or other components of the wireless device 11.

In certain embodiments, the processor 20 can be configured to facilitate implementation of various processes on the wireless device 11. The processor 20 can be a general purpose computer, special purpose computer, or other programmable data processing apparatus. In certain implementations, the wireless device 11 can include a computer-readable memory 19, which can include computer program instructions that may be provided to and executed by the processor 20.

The battery 21 can be any suitable battery for use in the wireless device 11, including, for example, a lithium-ion battery. The battery 21 may provide a battery voltage to one or more components of the wireless device 11. In some cases, the battery voltage supplied by the battery 21 does not satisfy a required voltage by one or more of the elements of the mobile device 21. For example, some elements may require a higher voltage, while other elements may require a lower voltage. In some such cases, a voltage regulator (e.g., a LDO) may be used to modify a voltage supplied to an element of the wireless device 11.

The illustrated wireless device 11 includes the diversity antenna(s) 22, which can help improve the quality and reliability of a wireless link. For example, including the diversity antenna(s) 22 can reduce line-of-sight losses and/or mitigate the impacts of phase shifts, time delays and/or distortions associated with signal interference of the primary antenna(s) 14. In some embodiments, the wireless device 11 can switch between use of a primary antenna 14 and a diversity antenna 23 based at least in part on a quality of a received signal. This quality may be determined by a number of signal properties. For example, if a signal received via the primary antenna 14 is highly attenuated, or attenuated beyond a threshold, the antenna switch module 12 may switch to a diversity antenna 22.

As shown in FIG. 1, the diversity module 23 is electrically connected to the diversity antenna(s) 22. The diversity module 23 can be used to process signals received and/or transmitted using the diversity antenna(s) 22. In certain configurations, the diversity module 23 can be used to provide filtering, amplification, switching, and/or other processing. Further, the diversity module 23 can be used to process a signal before providing the signal to the antenna switch module 12, which can provide the signal to the transceiver 13. In some cases, the diversity module 23 can include a number of switches for switching between high-band (HB) mid-band (MB), and low-band (LB) signals that may be received by and/or transmitted over one or more of the diversity antennas 22.

Example Diversity Module

Figure 2:
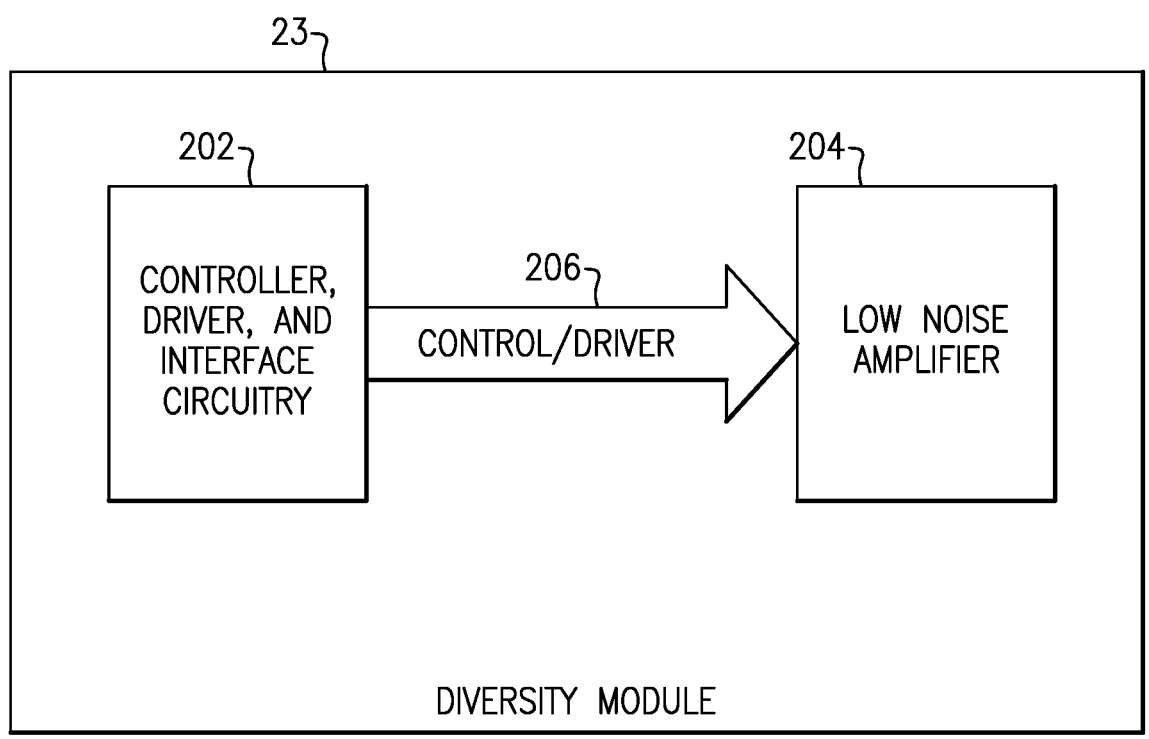
FIG. 2 is a schematic diagram of one example of a diversity module that can be included in a wireless device.

FIG. 2 is a schematic diagram of one example of a diversity module 23 that can be included in a wireless device 11. The diversity module 23 includes one or more low noise amplifiers (LNAs) 204. Further, the diversity module 23 includes controller, driver, and interface circuitry 202 that can provide control and driver signals 206 to the LNA 204.

The LNA 204 can be used to amplify weak signals and is typically used close to an antenna that is capturing received signals. The LNA 204 is configured to boost the power of a received signal while keeping injected noise and distortion to a minimum. In some embodiments, the LNA 204 may include one or more field-effect transistors (FETs), such as junction FETs (JFETs) and high electron mobility transistors (HEMTs).

The controller, driver, and interface circuitry 202 can include one or more circuit elements for controlling and for providing a driver signal to the LNA 204. Although illustrated as a single element, it should be understood that the circuitry 202 may include a number of elements. For example, circuitry 202 may include a driver circuit, a controller for setting the gain of the LNA 204, a controller for setting a voltage bias applied to the LNA 204, a bias circuit for biasing the LNA 204, etc.

Example Controller Circuit

Figure 3:
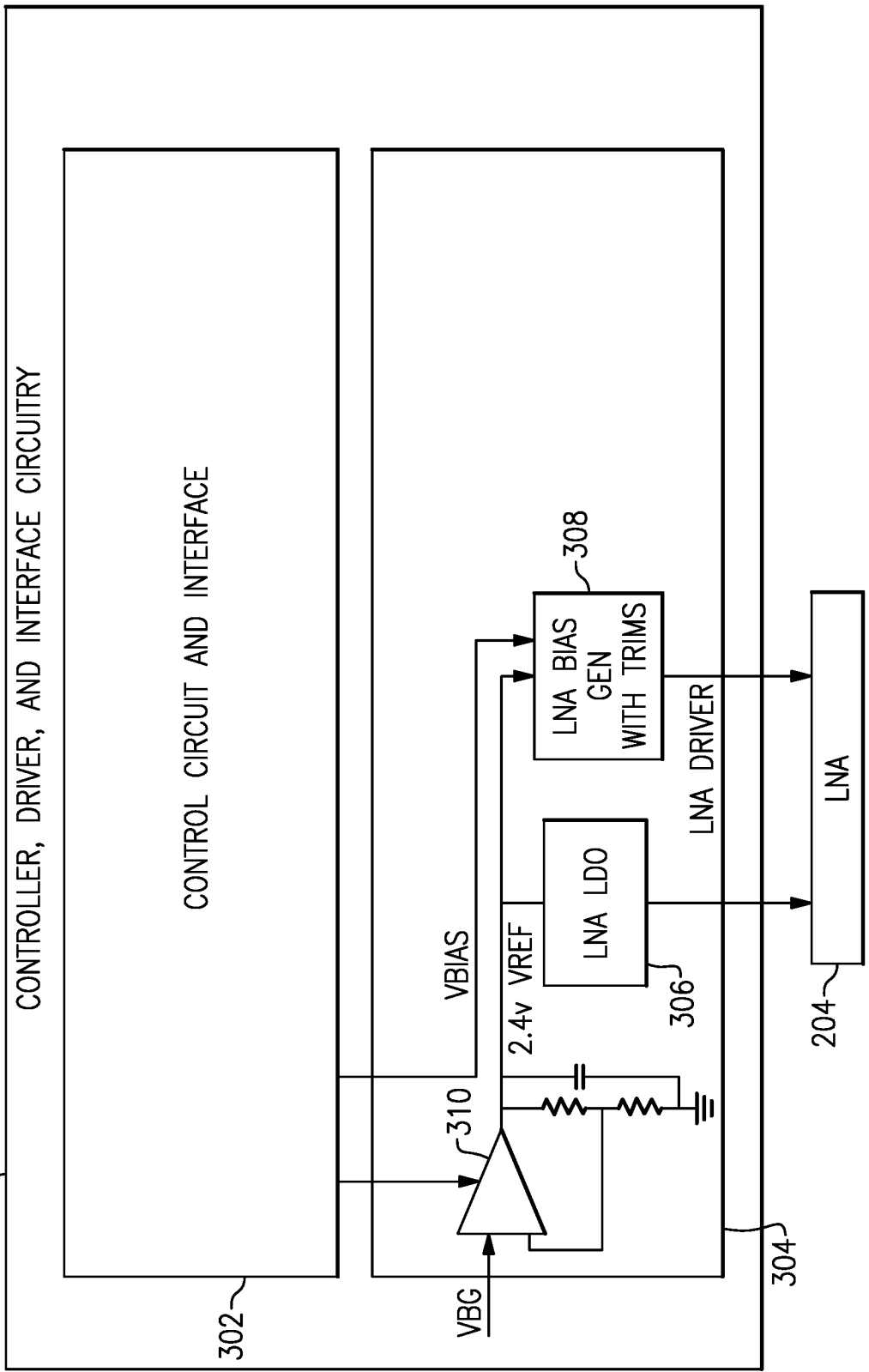
FIG. 3 is a schematic diagram of one example of a controller, driver, and interface circuitry block that may be included in a diversity block.

FIG. 3 is a schematic of one example of a controller, driver, and interface circuitry block 202 that may be included in a diversity module 23. As described above, the circuitry 202 may provide one or more control and/or driver signals to the LNA 204. These signals may be generated by an LNA driver 304. Further, as illustrated in FIG. 3, the LNA driver 304 may itself receive one or more control signals from a control circuit and interface block 302.

The control and interface block 302 may include a number of subsystems (not shown) for controlling the LNA driver 304. For example, the control and interface block 302 may include a bias generator controller (not shown) that can supply a bias control signal to the LNA bias generator block 308 of the LNA driver 304. Further, the control and interface block 302 may include a number of additional subsystems for controlling and maintaining the diversity module 23. For example, the block 302 may include an electrostatic discharge block (not shown) that can protect the diversity module 23 from sudden changes in electricity flow due to receipt of one or more input signals to the diversity module 23. Further, the circuit block 302 may include one or more interface blocks for processing received data and controls received via one or more input pins. In some cases, the interface block may be based on an interface design that satisfies the MIPI® Alliance radio frequency front end (RFFE) specifications. Alternatively, or in addition, the interface block may be configured as a general purpose input/output (GPIO) interface.

The LNA driver 304 includes a number of elements for providing one or more control voltages to the LNA 204. These control voltages can include one or more voltages for regulating the operating range and output of the LNA 204. For example, the control voltages may include a DC voltage supplied by a DC-DC regulator (e.g., an LDO), which may control the amplification factor provided by the LNA 204. As a second example, the control voltages may include a bias voltage that can be used to control a mode of operation of the LNA 204.

In some cases, the LNA driver 304 may include an amplifier 310 (e.g., an operational amplifier), an LNA LDO 306, and an LNA bias generator 308. The amplifier 310 may be configured to generate a reference signal based on a battery voltage and a bandgap voltage, $V_{BG}$. The battery voltage is generally related to a voltage supplied by the battery 21. The bandgap voltage is generally independent of the power supply or battery 21. Further, the bandgap voltage is often designed to be independent of temperature and a manufacturing process.

The LNA LDO 306 is a voltage regulator (e.g., a DC voltage regulator) used to regulate a voltage supplied to the LNA 204. The voltage supplied by the LDO 306 may be used to control the amplification factor of the LNA 204. This amplification factor can be used to determine how much to amplify a received signal from a diversity antenna 22.

The LNA bias generator 308 generates a bias voltage supplied to the LNA 204. This bias voltage may be used to control an operating mode of the LNA 204. Further, in some cases, the bias generator 308 may include one or more trim circuits for modifying or adjusting a bias current in small current increments. The trim circuits may be part of a digital to analog converter (DAC) that may be included by the bias generator 308. Further, the trim circuits may vary based on the number of bits supported by the DAC. Moreover, based on the number of bits of the trim circuits and/or the values of the bits, a different amount of bias current may be provided to the LNA 204 by the bias generator 308. The configuration of the trim circuits and, consequently, the amount of bias current provided to the LNA 204 may be determined by the control and interface block 302.

Example Low-Dropout Regulator

Figure 4:
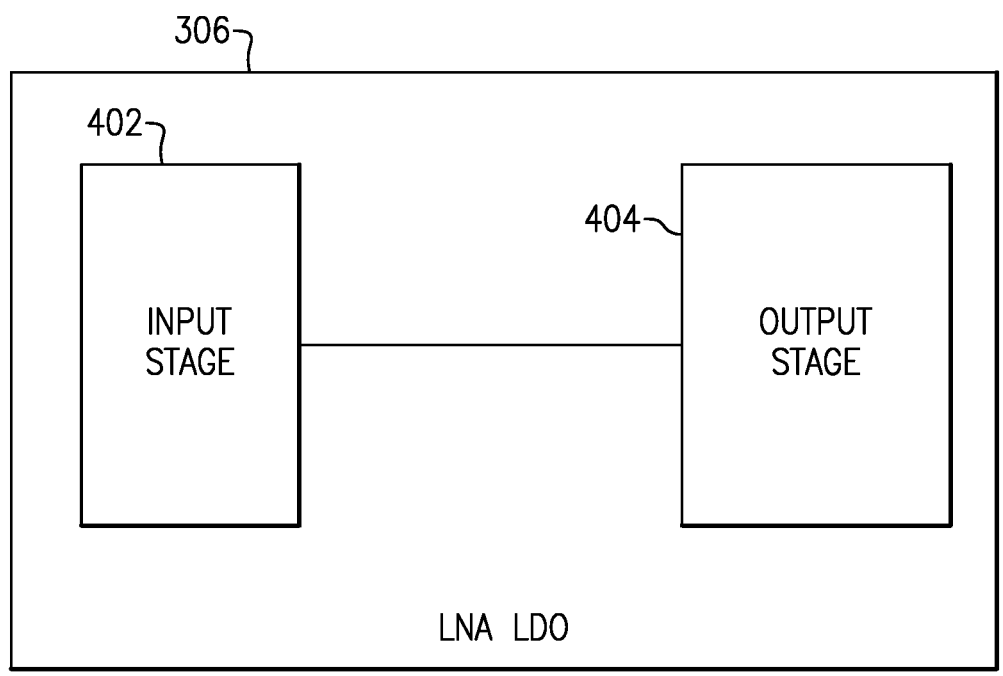
FIG. 4 is a schematic diagram of one example of a low-dropout regulator (LDO) that may be used to regulate a voltage supplied to a low noise amplifier.

FIG. 4 is a schematic of one example of a low-dropout regulator (LDO) 306 that may be used to regulate a voltage supplied to a low noise amplifier. As illustrated in FIG. 4, the LDO 306 may be divided into two circuit blocks, an input stage 402 and an output stage 404. The input stage 402 is configured to receive one or more control or configuration signals for the LDO 306. For example, the input stage 402 may receive a reference signal for generating the output voltage of the LDO 306. Further, the input stage 402 may receive a bias voltage for the transistors of the LDO 306.

The output stage 404 may include circuitry for generating an output voltage to be supplied to the LNA 204. Further, the output stage 404 may include control circuitry for controlling whether a voltage is supplied to the LNA 204. In some cases, the output stage 404 may receive a control signal indicating whether to supply the output voltage to the LNA 204. For example, if the LDO 306 is to be placed into a sleep mode, the output stage 404 may receive a control signal preventing output of a voltage to the LNA 204. In some such cases, the LNA 204 may also be placed in a sleep mode.

Figure 5A:
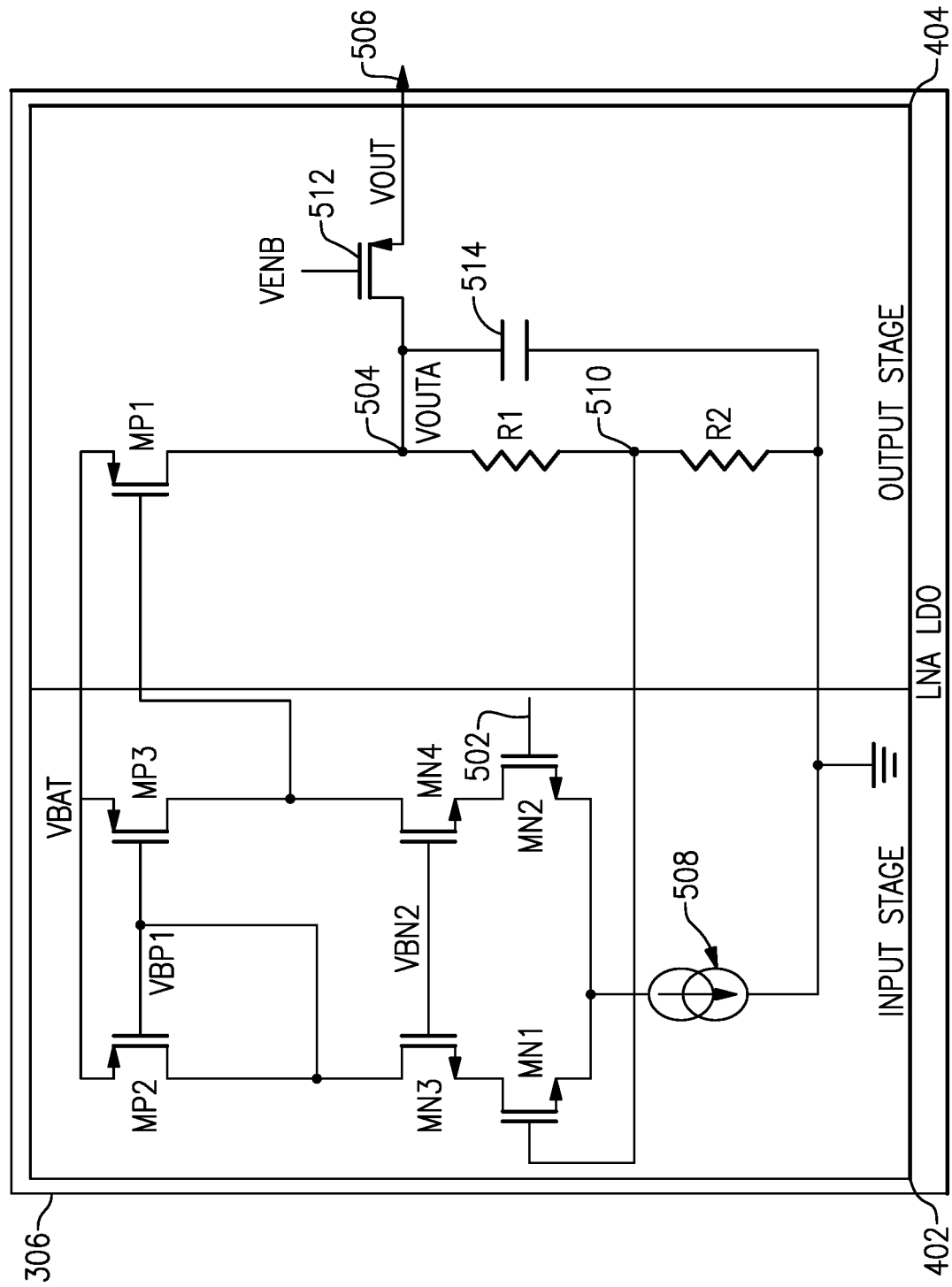
FIG. 5A is a circuit diagram for one example of a circuit for the low-dropout regulator of FIG. 4.

FIG. 5A is a circuit diagram for one example of a circuit for the low-dropout regulator 306 of FIG. 4. As illustrated in FIG. 5A, the input stage 402 includes a number of n-channel transistors, MN1, MN2, MN3, and MN4. The n-channel transistors may be configured as a current mirror. Further, the transistor MN2 is configured to receive, at the base of the transistor, a reference voltage, which may be supplied by the amplifier 310 of FIG. 3. Although illustrated as n-channel transistors, in some embodiments, p-channel transistors may be used for the transistors MN1, MN2, MN3, and MN4. Further, in some cases, these transistors may be FETs, JFETs, heterojunction bipolar transistors (HBTs), or any other type of transistor that can receive a reference voltage and supply the reference voltage to the node 510. In addition, the input state 402 may include a pair of p-channel transistors MP2 and MP3 that can control or vary the battery voltage VBAT supplied by the battery 21.

The input stage 402 can receive a battery voltage. This battery voltage may be supplied by the battery 21. Often, the battery voltage may exceed a voltage supported by the transistors of the LDO 306. For example, the output transistor MP1 may support up to 2.7 volts. Beyond 2.7 volts, the output transistor MP1 may enter a breakdown voltage region. If the output transistor MP1 enters a breakdown region, the transistor may overheat or become damaged. In some cases, the battery voltage may be between 2.4 v and 5 v.

Further, the input stage 402 may include a current source 508. This current source 508 may be a variable current source that can supply a current based on a control signal. When the LDO 306 is placed into a sleep mode, the current supplied by the current source 508 may be reduced to a fraction of its active mode current. For example, while in sleep mode, the current source 508 may supply a 0.5 μA current. As another example, the current source 508 may supply a current that is equal to or less than 1 μA when in sleep mode. In contrast, when in active move, the current source 508 may provide a larger current, such as a current between 2 and 10 μA. In some cases, the current may be greater than 10 μA (such as, for example, 11 μA, 15 μA, or 20 μA). It should be understood that the above current values are examples and that other currents are possible when in sleep mode and when not in sleep mode. Typically, the sleep mode current is some current value that is measurably less than the current supplied when not in sleep mode.

The small current provided by the current source 508 when in sleep mode may be used to bias the transistors of the input stage 402 of the LDO 306 when the LDO 306 is placed into sleep mode. Thus, when in sleep mode, the current source 508 may provide a bias current to one or more of the transistors MN1, MN2, MN3, MN4, MP2, and MP3. By supplying a small current when the LDO is placed into sleep mode, the transistors of the LDO 306 may be pre-charged. Advantageously, in certain embodiments, by pre-charging the transistors of the LDO 306, the transistors, and thus, the LDO 306, may be placed in active mode, or awoken from sleep mode, without waiting for the transistors to be charged. Thus, the LDO 306 may switch from sleep mode to active mode faster than traditional LDO designs.

Figure 5B:
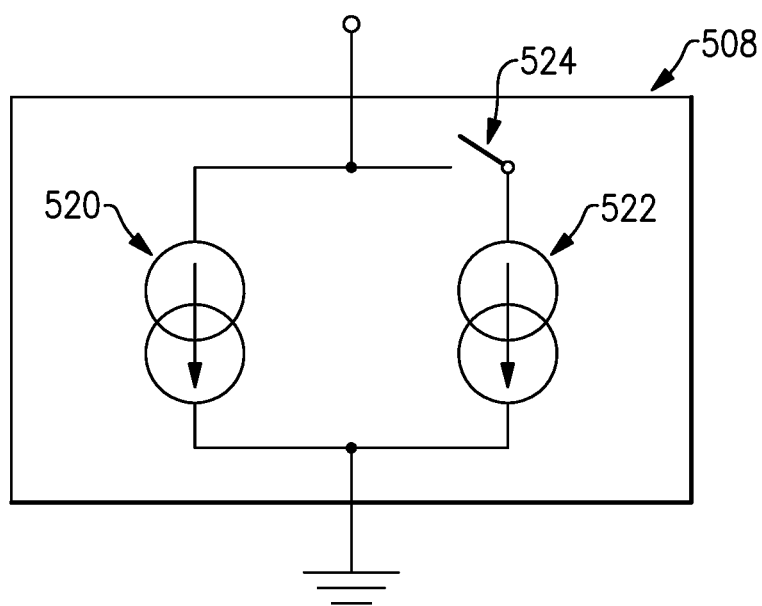
FIG. 5B is a circuit diagram for one example of a current source that may facilitate the implementation of sleep mode and awake mode for the low-dropout regulator of FIG. 5A.

FIG. 5B illustrates an example implementation of the current source 508. It should be understood that other implementations are possible and that the example illustrated in FIG. 5B is one non-limiting example. The current source 508 may be formed from two current sources 520, 522 arranged in parallel. The current source 520 may be configured to always be on during operation of the LDO 306. In contrast, the current source 522 may be disconnected by opening a switch 524 when the LDO enters sleep mode. Thus, when in sleep mode, the current source 520 supplies a current while the current source 522 does not supply a current or is disconnected.

When the LDO 306 is in active or awake mode, or awakens from sleep mode, the switch 524 may be closed, thereby connecting the current source 522 in parallel with the current source 520. Advantageously, in certain embodiments, because the current source 508 continues to provide current when in sleep mode via the current source 520, the time required to transition from sleep mode to awake mode is eliminated or reduced compared to LDOs that use other sleep mode circuits. Typically, although not necessarily, the current source 520 will be much smaller than the current source 522. Thus, when in sleep mode, the current may be a fraction of the current provided by the current source 508. For example, the current source 520 may be 0.5 μA or 1 μA while the current source 522 may be 1 μA, 10 μA, or 14 μA, etc. The current sources 520, 522 may, in some embodiments, be implemented as transistors.

Returning to FIG. 5A, the output stage 404 includes an output transistor MP1. As illustrated in FIG. 5A, the output transistor MP1 may be a p-channel transistor, which is in contrast to the reference voltage input transistors, MN1-MN4. In some embodiments, the output transistor MP1 and the reference voltage input transistors MN1-MN4 may be of the same type. In other words, in some cases, the transistors MN1-MN4 and MP1 may be n-channel or p-channel transistors.

In some LDO designs, the MP1 transistor may have a voltage applied that places the MP1 transistor into a breakdown region. To avoid this, the LDO may enter a sleep mode which grounds the MP1 transistor. When the LDO is removed from sleep mode, a non-negligible amount of time is required to charge and/or bias the MP1 transistor, and other transistors of the LDO, to an active operating state. In the LDO 306, the MP1 transistor receives a small current from the current source 508 when the LDO 306 is placed into sleep mode. Advantageously, in certain embodiments, the time required to transition from a sleep state to an active operating state is eliminated or becomes negligible due, at least in part, to the small current from the current source 508. In some cases, the current from the current source 508 enables the transistors of the LDO 306 to be pre-charged.

Further, by removing the sleep circuit from the LDO 306, and by constantly applying a current to the output transistor MP1, the output node 504 can be maintained at a constant voltage, such as 2.4 volts. Thus, in some embodiments, the output transistor MP1 is prevented from having a voltage that exceeds 2.7 volts. Hence, the output transistor MP1 does not enter its breakdown region. Moreover, the node 504, or $V_{OUT4}$, may be driven to approximately 2.3 or 2.4 volts regardless of whether the LDO 306 is in active mode or sleep mode.

Although the transistors of the LDO 306 may avoid entering a breakdown voltage region, in some cases, it is desirable for the LDO 306 to enter sleep mode. For example, to save power when a signal is not being received or when the primary antenna 14 is supplying a received signal, the LDO 306 may be placed into sleep mode. In some cases, to prevent the voltage from being supplied to the output transistor MP1 from being supplied to, for example, the LNA 204, a cutoff transistor may be added between the node 504 and the output of the LDO 306.

The output stage 404 may further include a cutoff transistor 512 and a capacitor 514. The cutoff transistor 512 may be a p-channel resistor like the output resistor MP1. In some cases, the cutoff transistor 512 may be a switch that is open or closed based on a control signal. The cutoff transistor 512 may receive the control signal at the base of the transistor or at the switch. Based on this control signal, the cutoff transistor 512 will output zero volts to the LNA 204 or an output voltage. Thus, the control signal supplied to the base of the cutoff transistor 512 can serve to place the LDO 306 into sleep mode, or to awaken the LDO 306 from sleep mode. As illustrated in FIG. 5A, the cutoff transistor 512 may be a p-channel resistor. Thus, the cutoff transistor 512 may be enabled when a logic low signal is received. In some cases, the control signal may be referred to as $V_{ENB}$. Thus, in certain embodiments, the output voltage is supplied to the LNA 204 when $V_{ENB}$ is driven low. The control signal supplied to the base of the cutoff transistor 512 may be provided by the control circuit and interface block 302. Further, the control signal may be obtain from the control 18.

Further, the capacitor 514 may store a charge received from the current source 508. Thus, because the current source 508 is active in both sleep mode and awake mode, the node 504 may maintain a charge regardless of whether the LDO 306 is in sleep mode or not. Advantageously, when transitioning from sleep mode to awake mode, the node 504 of the LDO 306 has a charge and thus, does not need to wait to be charged as occurs with LDO systems that do not include one or more of the embodiments of the structures disclosed herein. The amount of time required to charge the node 504 and/or to awaken from sleep mode varies based on the LDO design and application. For example, it may take several nanoseconds or up to 20 or 30 µs, and, in some cases, as many as 20 to 30 milliseconds or more. Thus, advantageously, in certain embodiments, the time for the LDO 306 to awaken from sleep mode may be reduced by a few nanoseconds to up to 20 or 30 milliseconds or more based, at least in part, on the application and structure of the LDO 306.

The voltage output by the LDO 306 may be based on a ratio of the resistors R1 and R2, and the reference voltage that may be applied to the node 510. For example, the voltage $V_{OUT}$ may be determined as R2/(R1+R2)*the reference voltage at node 510.

Example LDO Circuit Control Process

Figure 6:
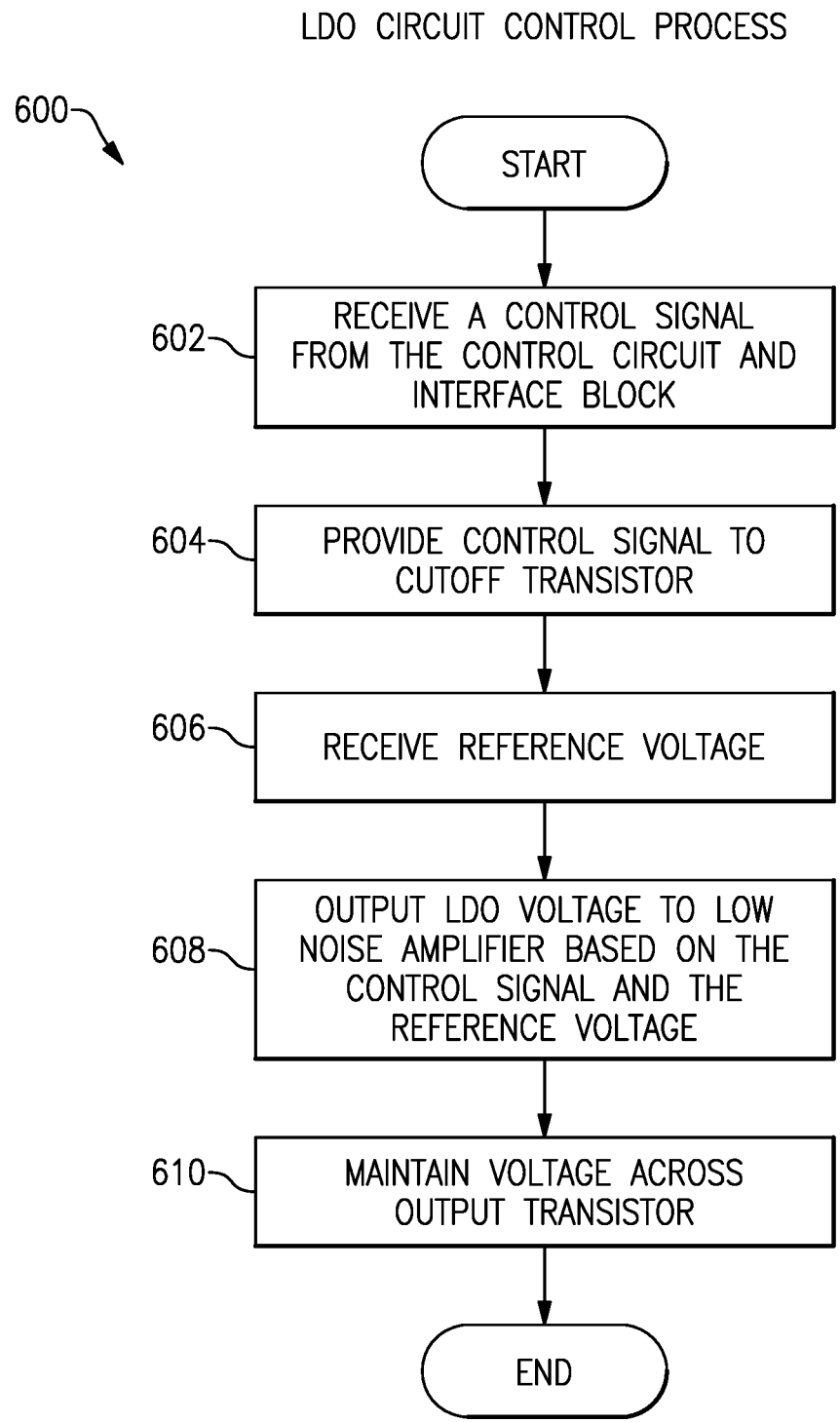
FIG. 6 is a flowchart of one example of an LDO circuit control process.

FIG. 6 is a flowchart of one example of an LDO circuit control process 600. It should be understood that the process 600 is one example of a process for controlling the LDO circuit 306. Other processes for controlling the LDO 306 are possible. For example, operations of the process 600 may be performed in a different order or substantially in parallel. Thus, the order of the operations described with respect to the process 600 is for ease of description and not to limit the process 600.

The process 600 may begin when the LDO 306 receives a control signal from the control circuit and interface block 302 at block 602. This control signal may be received from a controller 18. Further, in some cases, the control signal may be determined based on configuration instructions stored in a memory, such as the computer readable medium 19. In some cases, the control may be defined by a manufacturer and stored in the computer readable medium 19. Alternatively, or in addition, the control may be based on a signal received from a base station or other system in communication with the wireless device 11.

At block 604, the control signal is provided to the cutoff transistor 512. In certain embodiments, when the control signal corresponds to a low voltage or a logic-low signal, the LDO 306 is in active mode, and a voltage may be output by the LDO 306 based at least in part on a reference voltage. On the other hand, when the control signal corresponds to a high voltage, or logic high signal, the cutoff transistor 512 is placed into a sleep mode or a power down mode, and no voltage is supplied by the LDO 306. In certain embodiments, the voltage logic may be switched. In other words, in some cases, the LDO 306 outputs a voltage when the control signal corresponds to logic high and does not output the voltage when the control signal corresponds to logic low.

At block 606, the LDO 306 receives a reference voltage. In certain embodiments, the voltage output by the LDO 306 is based upon the reference voltage. Further, in some cases, the voltage output by the LDO 306 is a fraction of the reference voltage. The fraction of the voltage output by the LDO 306 may be determined based on the selection of resistance values for R1 and R2. In certain embodiments, the resistors R1 and R2 may vary based on operation. For example, one or more of the resistors R1 and R2 may be variable resistors.

The LDO 306 outputs a voltage to the LNA 204 based at least in part on the control signal and the reference signal at block 608. The control signal may be used to configure a switch or the cutoff transistor 512 to permit the LDO 306 to output a non-zero voltage or to prevent the LDO 306 from outputting a voltage, such as when the LDO 306 is to be placed in sleep mode.

At block 610, the LDO 306 maintains a voltage across the output transistor MP1. Maintaining the voltage across the output transistor MP1 can include generating a current which is provided to the transistor MP1. Further, in some embodiments, the voltage is maintained across additional transistors of the LDO 306 including, for example, the reference voltage input transistors MN1-MN4. In some cases, the voltage maintained across one or more of the transistors may differ from one non-zero voltage to another non-zero voltage based at least in part on whether the LDO 306 is in a sleep mode or an active mode.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A low-dropout regulator circuit for use at an input of a subsequent circuit element, the low-dropout regulator comprising:
    an input stage circuit including a current source and an input transistor network configured to receive a reference voltage input; and
    an output stage circuit including an output transistor and a cutoff transistor, the cutoff transistor configured to control output of a regulated output voltage supplied by the output transistor to a subsequent circuit element separate from the low-dropout regulator based at least in part on the reference voltage and a resistor ratio, and the current source configured to pre-charge one or more transistors of the low-dropout regulator circuit by supplying a sleep current to the one or more transistors of the low-dropout regulator circuit when the low-dropout regulator circuit enters a sleep mode.

2. The low-dropout regulator circuit of claim 1 wherein the sleep current is less than 0.5 µA.

3. The low-dropout regulator circuit of claim 1 wherein the sleep current is less than or equal to 1.0 µA but greater than 0.

4. The low-dropout regulator circuit of claim 1 wherein the sleep current is less than an operating current supplied to the one or more transistors of the low-dropout regulator circuit when the low-dropout regulator circuit is not in the sleep mode.

5. The low-dropout regulator circuit of claim 1 wherein the input transistor network includes at least one current mirror.

6. The low-dropout regulator circuit of claim 1 wherein transistors of the input transistor network are n-channel field-effect transistors, and the output transistor and the cutoff transistor are p-channel field-effect transistors.

7. The low-dropout regulator circuit of claim 1 wherein the cutoff transistor is positioned between a drain of the output transistor and an output of the low-dropout regulator circuit.

8. The low-dropout regulator circuit of claim 1 further including a first resistor and a second resistor connected in series, the first resistor positioned between a drain of the output transistor and a node configured to be at the reference voltage, the second resistor positioned between the node and a ground node, the output voltage based at least in part on a ratio of a value of the second resistor to a total resistance of the first resistor and the second resistor.

9. The low-dropout regulator circuit of claim 1 wherein the cutoff transistor enables the low-dropout regulator circuit to enter the sleep mode without the inclusion of a sleep circuit in the low-dropout regulator circuit.

10. A mobile device, comprising:
    one or more antennas; and
    a diversity module coupled to at least one of the antennas and including a low noise amplifier and a controller, the controller including a low-dropout regulator circuit having an input stage circuit including a current source and an input transistor network configured to receive a reference voltage input, the low-dropout regulator further including an output stage circuit including an output transistor and a cutoff transistor, the cutoff transistor configured to control output of a regulated output voltage supplied by the output transistor to a subsequent circuit element separate from the low-dropout regulator based at least in part on the reference voltage and a resistor ratio, and the current source configured to pre-charge one or more transistors of the low-dropout regulator circuit by supplying a sleep current to the one or more transistors of the low-dropout regulator circuit when the low-dropout regulator circuit enters a sleep mode.

11. The mobile device of claim 10 wherein the sleep current is a fraction of the current supplied to transistors of the input stage circuit when the low-dropout regulator circuit is not in sleep mode.

12. The mobile device of claim 10 wherein transistors of the input transistor network are of a first transistor type and the cutoff transistor and the output transistor are of a second transistor type that differs from the first transistor type.

13. The mobile device of claim 10 wherein the cutoff transistor supplies the output voltage to the low noise amplifier when the low-dropout regulator is not in sleep mode and the output voltage is based at least in part on a reference voltage supplied to the low-dropout regulator.

14. The mobile device of claim 10 wherein the cutoff transistor enables the low-dropout regulator circuit to enter the sleep mode without the inclusion of a sleep circuit in the low-dropout regulator circuit.

15. The mobile device of claim 10 wherein the input transistor network includes at least one current mirror.

16. The mobile device of claim 10 wherein the current supplied to the one or more transistors when the low-dropout regulator circuit enters the sleep mode is less than 0.5 µA.

17. The mobile device of claim 10 wherein the current supplied to the one or more transistors when the low-dropout regulator circuit enters the sleep mode is less than or equal to 1.0 µA but greater than 0.

18. The mobile device of claim 10 wherein the current supplied to the one or more transistors when the low-dropout regulator circuit enters the sleep mode is less than an operating current supplied to the transistors when the low-dropout regulator circuit is not in the sleep mode.

19. A method of controlling a low-dropout regulator circuit, the method comprising:
   providing a control signal to a cutoff transistor of the low-dropout regulator circuit;
   maintaining a voltage across an output transistor regardless of whether the control signal is associated with a sleep mode;
   generating an output voltage based at least in part on a reference voltage and a resistor ratio;
   providing the output voltage from the low-dropout regulator circuit to a subsequent circuit element separate from the low-dropout regulator; and
   in response to the control signal being associated with the sleep mode, pre-charging one or more transistors of the low-dropout regulator circuit by providing a current to the one or more transistors of the low-dropout regulator circuit.

20. The method of claim 19 wherein the current provided to the one or more transistors is less than or equal to 1 µA, but greater than 0.

* * * * *